US011853801B2

United States Patent
Wen et al.

(10) Patent No.: US 11,853,801 B2
(45) Date of Patent: Dec. 26, 2023

(54) PLUG-IN FOR ENHANCING RESOURCE ELASTIC SCALING OF DISTRIBUTED DATA FLOW AND METHOD FOR ENHANCING PLUG-IN FOR ENHANCING RESOURCE ELASTIC SCALING OF DISTRIBUTED DATA FLOW

(71) Applicant: Tsinghua University, Beijing (CN)

(72) Inventors: Lijie Wen, Beijing (CN); Zan Zong, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/791,484

(22) PCT Filed: Oct. 20, 2021

(86) PCT No.: PCT/CN2021/124859
§ 371 (c)(1),
(2) Date: Jul. 7, 2022

(87) PCT Pub. No.: WO2022/121519
PCT Pub. Date: Jun. 16, 2022

(65) Prior Publication Data
US 2023/0129969 A1    Apr. 27, 2023

(30) Foreign Application Priority Data
Dec. 10, 2020  (CN) .......................... 202011434620.8

(51) Int. Cl.
*G06F 9/50* (2006.01)
*G06N 20/00* (2019.01)
*G06F 9/445* (2018.01)

(52) U.S. Cl.
CPC ........ *G06F 9/5027* (2013.01); *G06F 9/44526* (2013.01); *G06N 20/00* (2019.01)

(58) Field of Classification Search
None
See application file for complete search history.

(56) References Cited

U.S. PATENT DOCUMENTS 10,509,683 B2 * 12/2019 Furman ................. G06F 9/5061
2012/0198466 A1 * 8/2012 Cherkasova .......... G06F 9/5066
                                                            718/104

(Continued)

FOREIGN PATENT DOCUMENTS

| CN | 106534307 A | 3/2017 |
| CN | 110941489 A | 3/2020 |

(Continued)

OTHER PUBLICATIONS

Zhang et al.; "Machine Learning Based Resource Allocation of Cloud Computing in Auction"; Tech Science Press 2018; CMC, vol. 56, No. 1, pp. 123-135; (Zhang_2018.pdf) (Year: 2018).*

(Continued)

*Primary Examiner* — Hiren P Patel
(74) *Attorney, Agent, or Firm* — Chiesa Shahinian & Giantomasi PC

(57) ABSTRACT

The present disclosure relates to a plug-in for enhancing resource elastic scaling of a distributed data flow and a method for enhancing a plug-in for enhancing resource elastic scaling of a distributed data flow. The plug-in is connected to a scaling controller used for resource elastic scaling of a distributed data flow. The plug-in includes a decision maker, a decision model, and a scaling operation sample library. The scaling controller registers a data flow to the plug-in through a first interface. The scaling controller sends an optimal decision of resource scaling in each status to the plug-in through a second interface. The scaling operation sample library is configured to record the optimal decision of resource scaling in each status. The decision model is configured to predict a received data flow based on (Continued)

the optimal decision recorded in the scaling operation sample library, to generate a prediction decision.

3 Claims, 5 Drawing Sheets

(56) References Cited

U.S. PATENT DOCUMENTS

| | | | | |
|---|---|---|---|---|
| 2013/0212277 | A1* | 8/2013 | Bodik | G06F 9/4887 709/226 |
| 2016/0323377 | A1* | 11/2016 | Einkauf | G06F 9/5077 |
| 2017/0090990 | A1* | 3/2017 | Furman | G06F 9/5061 |
| 2017/0126792 | A1* | 5/2017 | Halpern | H04L 67/1001 |
| 2017/0243140 | A1* | 8/2017 | Achin | G06Q 10/06 |
| 2018/0113742 | A1* | 4/2018 | Chung | G06F 9/4881 |
| 2018/0205616 | A1* | 7/2018 | Liu | G06F 8/20 |
| 2018/0255122 | A1* | 9/2018 | Hu | G06F 11/3433 |
| 2019/0138974 | A1* | 5/2019 | Knight | G06Q 10/083 |
| 2019/0171897 | A1* | 6/2019 | Merai | G06N 5/048 |
| 2019/0179940 | A1* | 6/2019 | Ross | G06F 16/953 |
| 2019/0227847 | A1* | 7/2019 | Jha | G06N 3/045 |
| 2019/0311442 | A1* | 10/2019 | Helsel | G06Q 10/06312 |
| 2020/0042832 | A1* | 2/2020 | Kim | G06F 18/217 |
| 2020/0320428 | A1* | 10/2020 | Chaloulos | G06N 20/00 |
| 2021/0109789 | A1* | 4/2021 | McWeeney | G06F 9/5022 |
| 2021/0181739 | A1* | 6/2021 | Chen | G06F 9/5072 |
| 2021/0264290 | A1* | 8/2021 | Murali | G06N 5/01 |
| 2021/0326185 | A1* | 10/2021 | Opsenica | G06F 9/5077 |
| 2021/0406733 | A1* | 12/2021 | Dubey | G06N 7/01 |
| 2022/0075664 | A1* | 3/2022 | Fawcett | G06F 9/5005 |

FOREIGN PATENT DOCUMENTS

| | | |
|---|---|---|
| CN | 111130834 A | 5/2020 |
| CN | 112416602 A | 2/2021 |

OTHER PUBLICATIONS

International Search Report (with Translation) and Written Opinion dated Jan. 19, 2022 of International Appl. No. PCT/CN2021/124859.

* cited by examiner

PLUG-IN FOR ENHANCING RESOURCE ELASTIC SCALING OF DISTRIBUTED DATA FLOW AND METHOD FOR ENHANCING PLUG-IN FOR ENHANCING RESOURCE ELASTIC SCALING OF DISTRIBUTED DATA FLOW

CROSS REFERENCE TO RELATED APPLICATION(S)

The present application claims priority to and is a 35 U.S.C. 371 United States National Phase application based on International Patent Application No. PCT/CN2021/124859, filed Oct. 20, 2021, which claims priority to the Chinese Patent Application No. 202011434620.8, filed with the China National Intellectual Property Administration (CNIPA) on Dec. 10, 2020, and entitled "PLUG-IN FOR ENHANCING RESOURCE ELASTIC SCALING OF DISTRIBUTED DATA FLOW AND METHOD FOR ENHANCING PLUG-IN FOR ENHANCING RESOURCE ELASTIC SCALING OF DISTRIBUTED DATA FLOW", the disclosures of all of these applications are incorporated herein by reference in their entireties.

TECHNICAL FIELD

The present disclosure relates to the field of data flow resource allocation, and in particular, to a plug-in for enhancing resource elastic scaling of a distributed data flow and a method for enhancing a plug-in for enhancing resource elastic scaling of a distributed data flow.

BACKGROUND ART

A distributed data flow application usually provides a real-time data processing service with a long lifecycle. A typical stream processing scenario usually is accompanied by fluctuation in a data flow load. For example, a data volume of emotion analysis services on a social networking site may significantly decrease at night. A data traffic of a sensor is usually related to a usage frequency of a device. Therefore, a sudden increase or decrease in the data flow load may affect a distributed data flow performing a real-time data processing operation. When the load suddenly increases, a resource allocated to the distributed data flow may fail to meet a computing requirement, resulting that a processing rate cannot be consistent with a data inflow rate. Alternatively, when the load suddenly decreases, the distributed data flow may occupy too many resources, resulting in a waste of resources. Thus, the data flow requires an elastic scaling controller to complete elastic scaling of a resource with a size of a load. A data flow application usually abstract resources into instances, and each instance includes a specific quantity of CPU cores and memories. The elastic scaling controller automatically controls a quantity of instances used by a data flow, so as to perform a resource scaling operation.

Based on a responsive adjustment strategy, that a resource quantity of the data flow can match a current data inflow rate is implemented by an existing resource elastic scaling controller. Usually, a data flow application includes multiple computing nodes, and a minimum unit of resource allocation for each computing node is "instance". By increasing or reducing an instance quantity, computing resources can be dynamically increased or decreased for the data flow.

It is assumed that a data inflow rate of one computing node of the data flow is $\lambda$, by observing a current computing status of the computing node, it can be measured that a data processing capability of the node is $\lambda_P$. Theoretically, $\lambda/\lambda_P$ instances allocated to the computing node can match the current data inflow rate. Since there may be a "one-to-one" or "many-to-one" node connection relationship in the data flow, $\lambda$ of each node may be calculated based on an output rate of an upstream node. Starting from a data source node, computing nodes are sequentially traversed based on a topology sorting order, and an instance quantity that should be allocated to each node may be calculated.

In the above calculation process, quick calculation of an optimal instance quantity can be completed by monitoring a traffic of each node of the data flow. However, in practice, increasing of an instance quantity often cannot bring a linear improvement in performance, so it is impossible to allocate the instance quantity in one step. There are factors such as different network transmission overheads of distributed programs or different computing capabilities of heterogeneous machines. Thus, based on this method, a process of "calculating an instance quantity—verifying optimal" needs to be iterated many times, until an instance quantity calculated based on a current data load no longer changes. This computing-based controller can faster achieve elastic resource scaling than a rule-based elastic scaling controller. However, experiments prove that based on this method, multiple attempts are still required to complete one time of resource elastic scaling.

SUMMARY

The present disclosure aims to provide a plug-in for enhancing resource elastic scaling of a distributed data flow and a method for enhancing a plug-in for enhancing resource elastic scaling of a distributed data flow, so as to improve accuracy and efficiency of resource elastic scaling.

In order to achieve the above objective, the present disclosure provides the following technical solutions:

A plug-in for enhancing resource elastic scaling of a distributed data flow is provided. The plug-in is connected to a scaling controller used for resource elastic scaling of a distributed data flow. The plug-in includes a decision maker, a decision model, and a scaling operation sample library.

The scaling controller registers a data flow to the plug-in through a first interface. The scaling controller sends an optimal decision of resource scaling in each status to the plug-in through a second interface. The optimal decision is a resource allocation decision enabling a resource quantity of a data flow in a current status to adapt to a current input data volume.

The scaling operation sample library is configured to record the optimal decision of resource scaling in each status. The decision model is configured to predict a received data flow based on the optimal decision recorded in the scaling operation sample library, to generate a prediction decision. The decision model is a machine learning model. The decision maker is configured to determine a recommended decision based on the prediction decision. The recommended decision is the prediction decision or a decision generated by a current scaling controller. The decision maker returns the recommended decision to the scaling controller through the second interface.

The scaling controller performs a scaling operation on the current data flow based on the recommended decision.

Optionally, the plug-in is connected to the scaling controller through an HTTP interface.

Optionally, the scaling controller is further configured to: after completing a scaling operation, determine decision quality of a recommended decision corresponding to the scaling operation, and feedback the decision quality to the plug-in through a third interface. The decision quality of a recommended decision is used to determine whether the recommended decision is optimal. When the recommended decision is optimal, the plug-in stores the recommended decision in the scaling operation sample library as an optimal decision.

The first interface, the second interface, and the third interface are all HTTP interfaces.

Optionally, the decision maker is configured to: determine a recommended decision based on an uncertainty of the prediction decision; and when the uncertainty of the prediction decision is greater than a threshold, determine the decision generated by the scaling controller as a recommended decision; or when the uncertainty of the prediction decision is not greater than the threshold, determine the prediction decision as a recommended decision.

The present disclosure further provides a method for enhancing a plug-in for enhancing resource elastic scaling of a distributed data flow. The method for enhancing a plug-in for enhancing resource elastic scaling of a distributed data flow is applied to the plug-in for enhancing resource elastic scaling of a distributed data flow. The method for enhancing a plug-in for enhancing resource elastic scaling of a distributed data flow includes:

obtaining a current data flow;

generating, based on the current data flow, a prediction decision based on a scaling operation sample library by using a decision model;

obtaining a decision generated by a current scaling controller;

determining, based on the prediction decision, a recommended decision based on the decision maker, where the recommended decision is the prediction decision or the decision generated by the current scaling controller; and performing, by the scaling controller, a scaling operation on the current data flow based on the recommended decision.

Optionally, the generating, based on the current data flow, a prediction decision based on a scaling operation sample library by using a decision model specifically includes:

training the decision model based on the scaling operation sample library, to obtain a trained decision model; and predicting the current data flow by using the trained decision model, to generate a prediction decision.

Optionally, the determining, based on the prediction decision, a recommended decision based on the decision maker specifically includes:

judging, based on the decision maker, whether an uncertainty of the prediction decision is greater than a threshold; and determining, when the uncertainty of the prediction decision is greater than the threshold, the decision generated by the scaling controller as a recommended decision; or determining, when the uncertainty of the prediction decision is not greater than the threshold, the prediction decision as a recommended decision.

Optionally, after the performing, by the scaling controller, a scaling operation on the current data flow based on the recommended decision, the method further includes:

determining, after the scaling controller completes the scaling operation, decision quality of a recommended decision corresponding to the scaling operation, where the decision quality of a recommended decision is used to determine whether the recommended decision is optimal; and storing, when the recommended decision is optimal, the recommended decision in the scaling operation sample library as an optimal decision.

Optionally, the determining, after the scaling controller completes the scaling operation, decision quality of a recommended decision corresponding to the scaling operation specifically includes:

determining, by judging whether the recommended decision meets a convergence condition, whether the recommended decision corresponding to the scaling operation is optimal; and determining, when the recommended decision meets the convergence condition, that the recommended decision corresponding to the scaling operation is optimal, or determining, when the recommended decision does not meet the convergence condition, that the recommended decision corresponding to the scaling operation is not optimal.

According to the specific embodiments provided by the present disclosure, the present disclosure discloses the following technical effects:

During a sampling process of the scaling operation used by the plug-in in the present disclosure, a learning sample may be gradually acquired without interfering with working of the existing scaling controller, so as to use for model training. This sample acquisition process has no extra overhead, so that the plug-in can be "out-of-the-box". In addition, after the machine learning model is used to fit a sample, a model prediction value is not directly used as a final result. Further, a final decision is made after comprehensive consideration is given to the prediction quality of the model and the decision given by the current scaling controller. This helps ensure that the plug-in does not adversely affect the scaling controller, enhances decision accuracy of the existing elastic scaling controller, and implements that an elastic resource scaling operation can be completed by using only one decision. Fast resource scaling improves data processing capability rapidly when an allocated resource of a distributed data flow is insufficient, or reduces waste of resources when excessive resources are allocated.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following descriptions show merely some embodiments of the present disclosure, and those of ordinary skill in the art may still derive other accompanying drawings from these accompanying drawings without creative efforts.

Figure 1:
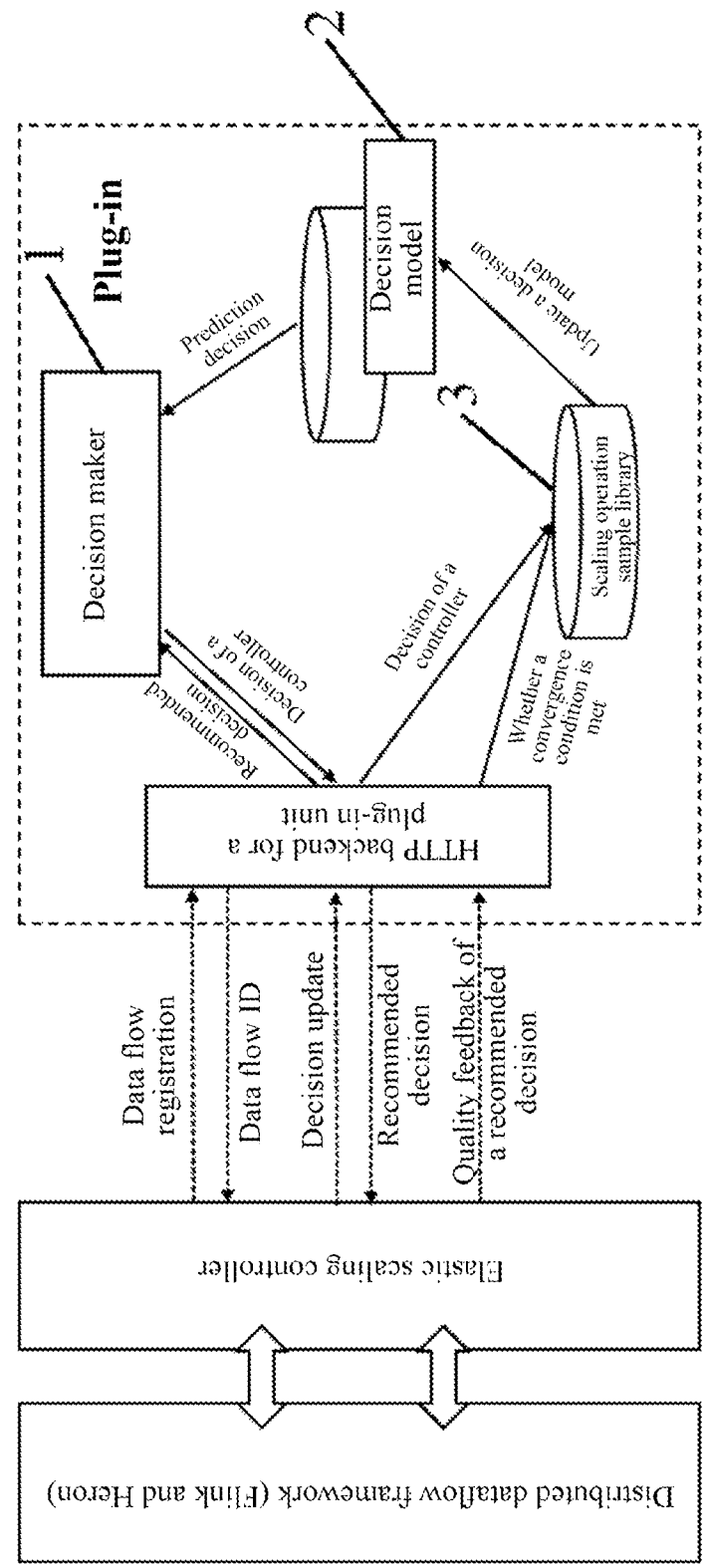
FIG. 1 is an architectural diagram of a plug-in for enhancing resource elastic scaling of a distributed data flow according to the present disclosure.

Reference numerals: 1 is a decision maker, 2 is a decision model, and 3 is a scaling operation sample library.

DETAILED DESCRIPTION OF THE EMBODIMENTS

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other examples obtained by a person of ordinary skill in the art based on the examples of the present disclosure without creative efforts shall fall within the protection scope of the present disclosure.

To make the above-mentioned objective, features, and advantages of the present disclosure clearer and more comprehensible, the present disclosure will be further described in detail below in conjunction with the accompanying drawings and specific embodiments.

FIG. 1 is an architectural diagram of a plug-in for enhancing resource elastic scaling of a distributed data flow according to the present disclosure. As shown in FIG. 1, the plug-in for enhancing resource elastic scaling of a distributed data flow in the present disclosure includes a decision maker 1, a decision model 2, and a scaling operation sample library 3. The plug-in in the present disclosure is connected to a scaling controller used for resource elastic scaling of a distributed data flow through an HTTP interface. Integration may be completed through a simple interface. The plug-in in the present disclosure connects three parts of the decision maker 1, the decision model 2, and the scaling operation sample library 3 to an existing scaling controller through an HTTP backend, so as to complete data transmission and function invocation. After integration, the plug-in does not affect a working manner of the existing scaling controller, and only provides a recommended scaling decision (a quantity of required instances of each computing node) in a subsequent resource scaling operation. After using the recommended decision, the elastic scaling controller needs to feedback, to the plug-in, whether the decision can complete scaling. Continually learning a decision of the controller brings an increasingly accurate recommended decision from the plug-in.

The plug-in in the present disclosure includes three HTTP interfaces: a data flow registration interface, a decision update interface, and a quality feedback interface of a recommended decision. The data flow registration interface is configured to register a new data flow to the plug-in. For a multi-tenant distributed dataflow framework, it is usually necessary to run numerous dataflow jobs. The plug-in also supports multiple tenants. The data flow registration interface is invoked, to register a topology of a data flow to the plug-in as a parameter. The topology of a data flow is represented by using a JavaScript object notation (JSON) format, and is used to record a name of each computing node, an initial instance quantity, and a node connection relationship. Information in the JSON format is sent to the plug-in as a parameter by using an HTTP request. The plug-in returns an identifier (ID) that can uniquely identify a data flow, so as to facilitate a subsequent interface to update and recommend a decision of the data flow.

An existing elastic scaling controller performs resource adjustment when a resource of a data flow is insufficient or excessive, for example, improves or reduces parallelism of a computing node. The decision update interface is configured to: when the elastic scaling controller performs a resource scaling operation, send an operation corresponding to a current data flow status to the plug-in, so that the plug-in learns a decision that should be made in the status. The method uses two indicators to represent a data flow status. A first indicator is a current throughput of a data flow, which reflects a current data load amount. A second indicator is a length of a queue waiting to be calculated in each node input queue, which reflects a "pressure" of each node of a data flow under a current resource configuration. The elastic scaling controller usually needs to use multiple decisions to complete one time of resource scaling. In the present disclosure, a result of a last decision is used as an optimal decision, because the decision can make a resource quantity of a data flow exactly match a current input data amount. The scaling controller sends an optimal decision corresponding to each status to the plug-in, so that the plug-in acquires decisions that need to be made in different statuses, and saves the decisions to the scaling operation sample library. This operation is a prerequisite for the plug-in to learn a best decision. When the plug-in acquires relatively little decision information, an accurate decision model cannot be obtained by training. Therefore, the plug-in directly returns a decision of the scaling controller. When the decision model may perform prediction with a relatively low uncertainty (Uncertainty), the plug-in returns a decision predicted by the model as a recommended decision.

The quality feedback interface of a recommended decision is configured to feedback quality of a recommended decision of the plug-in, so as to judge whether the recommended decision is optimal.

Figure 2:
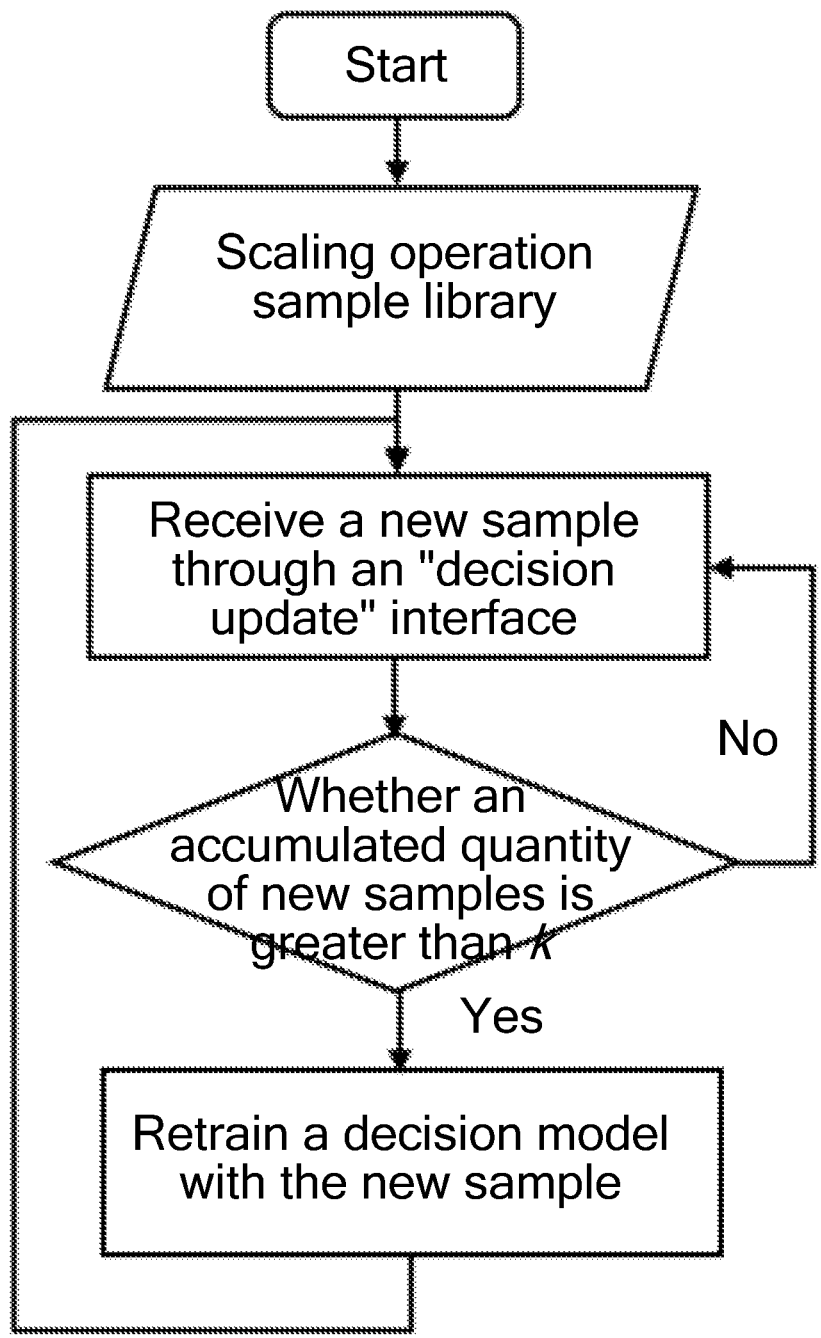
FIG. 2 is a schematic flowchart of generating a prediction decision by a decision model according to the present disclosure.

In the present disclosure, a problem of predicting an instance quantity of a computing node is defined as a regression problem. Because a sample dimension is relatively low and a predicted value is an integer, it is relatively easy to use a machine learning model for fitting. In addition, because quality of a prediction result needs to be judged in the present disclosure, distribution estimation is used instead of value estimation, and Bayesian linear regression is used for sample learning. As shown in FIG. 2, the decision model of the present disclosure constructs a model separately for each computing node of a data flow. The decision update interface of the plug-in in the present disclosure supports sample update of a single or multiple computing nodes. In an actual scenario, a node of a data flow may be more resource-sensitive (for example, a node with a most intensive computing operation in a topology of the data flow), thus being elastically scaled more frequently. This results that different computing nodes may have different quantities of samples in the scaling operation sample library. A sample includes a data flow status and an optimal instance quantity corresponding to the status. Optimal instance quantities corresponding to different statuses are predicted by separately training a model for each computing node, so as to achieve a resource configuration recommendation purpose. This operation may continue to run at a backend of the plug-in for continuing to learn a new sample.

Figure 3:
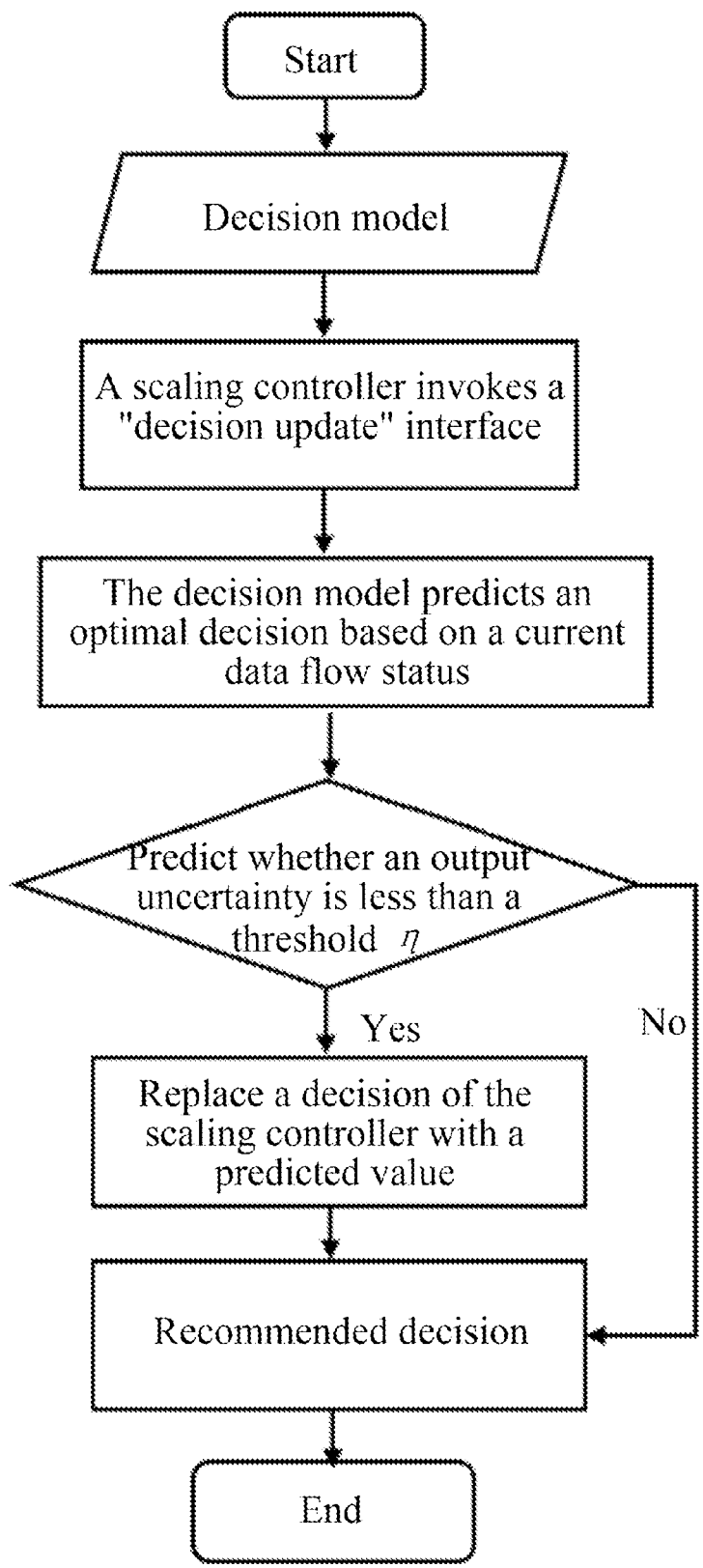
FIG. 3 is a schematic flowchart of determining a recommended decision by a decision maker according to the present disclosure.

Because the decision model cannot ensure accuracy of a prediction result, stability of the plug-in is enhanced by using a threshold-based judgment method in the present disclosure. As shown in FIG. 3, when the elastic scaling controller invokes the decision update interface, a continually trained decision model makes a decision based on a status of a current data flow, that is, predicts a quantity of instances required by a computing node. Because a prediction result of the Bayesian linear regression used by the plug-in is distribution, an uncertainty may be calculated based on output distribution information, and an uncertainty of the prediction result is used to judge accuracy of prediction from a model. When an uncertainty output by the model is less than or equal to a threshold η, the decision maker considers the prediction to be accurate, and further uses a prediction instance quantity to replace an instance quantity of a corresponding node in a decision given by the scaling controller. Alternatively, when an output uncertainty is greater than a threshold η, the decision maker considers that accurate of the prediction is not high. Therefore, the prediction result is ignored, and an instance quantity of the scaling controller is directly used. An instance quantity corresponding to each node is referred to as one decision. After the foregoing steps, the decision maker may generate a final recommended decision and return the final recommended decision to the scaling controller.

A strategy of the decision maker is as follows: When there are insufficient samples, a decision given by the scaling controller may be temporarily used. After being gradually accurate, a model may directly give an accurate resource scaling decision. After integrating the plug-in, the existing scaling controller may obtain a gradually accurate decision from the plug-in, and finally implement that the resource scaling operation can be complete based on one decision.

The scaling operation sample library records an optimal decision corresponding to a data flow in each status, that is, an instance quantity required by each computing node of the data flow in different data loads. To complete learning of optimal decisions in different statuses, the plug-in in the present disclosure first defines how to represent a data flow status. When a computing resource of a node of a data flow is insufficient, there is a back pressure phenomenon. In this case, data is accumulated in an output queue of an upstream computing node. A load status of processing data of a current data flow is measured by monitoring an output queue of each computing node of the data flow and a throughput of the current data flow. The elastic scaling controller usually requires multiple decisions to complete resource scaling, so as to reduce a pressure of the data flow. However, the scaling operation is stored in the scaling operation sample library of the plug-in through an interface, and is an optimal decision for learning.

Figure 4:
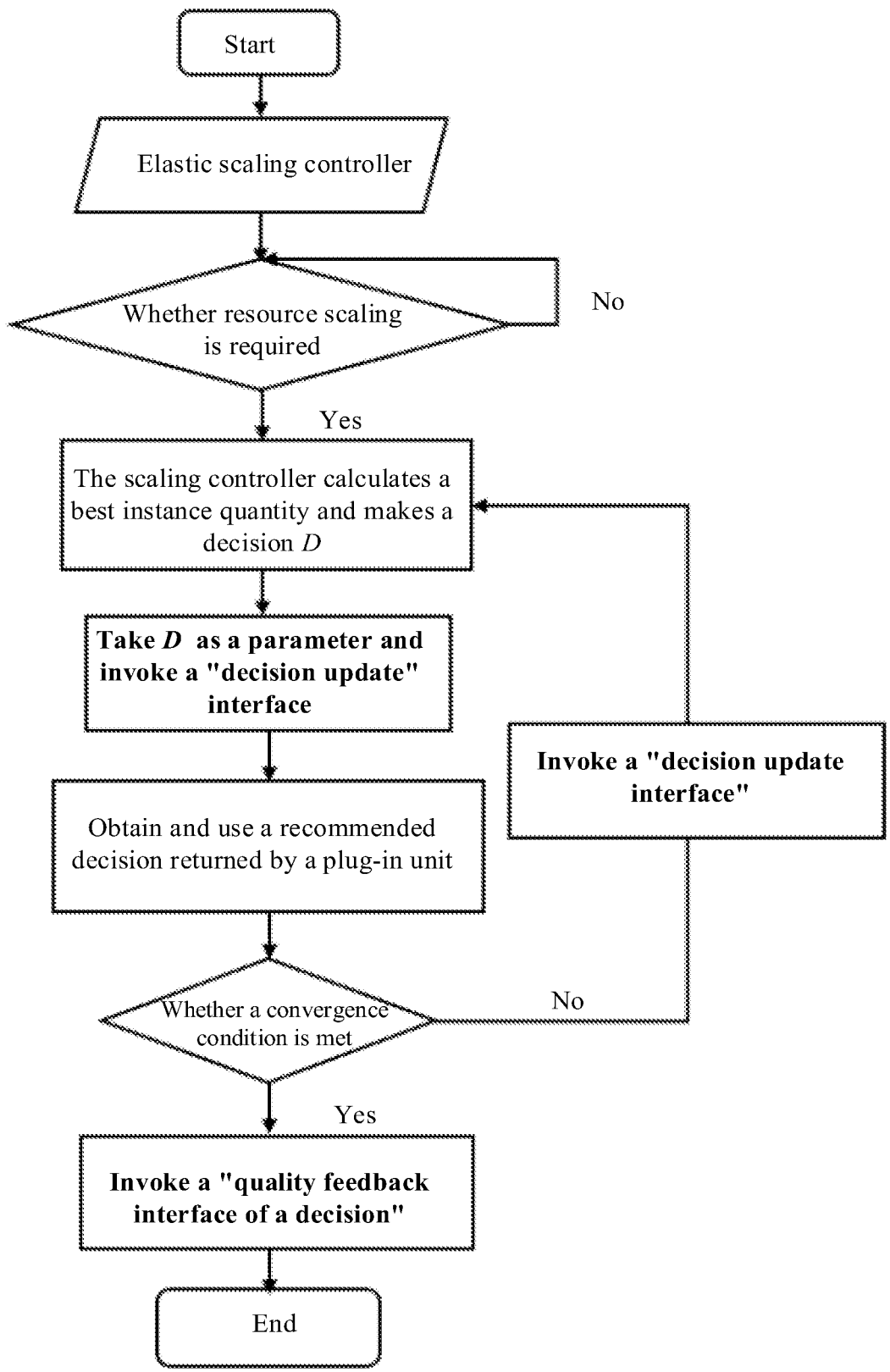
FIG. 4 is a schematic flowchart of feeding back decision quality by a scaling controller according to the present disclosure.

When to perform the resource scaling operation depends on implementation of the elastic scaling controller. Common methods for judging whether a resource scaling operation needs to be performed include comparing a difference between a data input traffic and an throughput of a data flow application, monitoring a data processing delay change, and the like. When judging that a scaling operation needs to be performed, the elastic scaling controller obtains a decision D based on the scaling strategy of the elastic scaling controller. Common methods for generating a decision by the scaling controller include a rule-based resource redistribution strategy, or resource usage modeling based on a queuing theory model. The plug-in treats a scaling control strategy as a black box, that is, paying no attention to how to obtain the decision D. The resource scaling controller usually requires multiple decisions to achieve convergence. Therefore, the present disclosure focuses on how to more accurately obtain an optimal decision in one time (for example, a decision meets a convergence condition, such as a data flow throughput matches an input traffic). As shown in FIG. 4, a decision generated by the controller is invoked to the decision update interface before being executed, and is further sent to the plug-in, so as to be used by the plug-in to generate a recommended decision. After obtaining the recommended decision obtained from the decision model of the plug-in by combining with the strategy of the decision maker, the elastic scaling controller executes the recommended decision, to complete resource scaling of a current step and observe whether the decision meets the convergence condition. A convergence result, that is, a quality result of the recommended decision, is sent to the plug-in by invoking the quality feedback interface of a recommended decision. When the recommended decision meets the convergence condition, it is determined that the recommended decision is an optimal decision in a current status. Judgment of a convergence manner relates to implementation of the scaling controller. For example, a difference between a throughput and an input data traffic is less than a threshold, or the controller makes multiple decisions that remain unchanged.

As a data flow load changes, an optimal decision performed by the elastic scaling controller is gradually stored in the scaling operation sample library. The sample contains an optimal instance quantity corresponding to a computing node in a specific data flow status.

Figure 5:
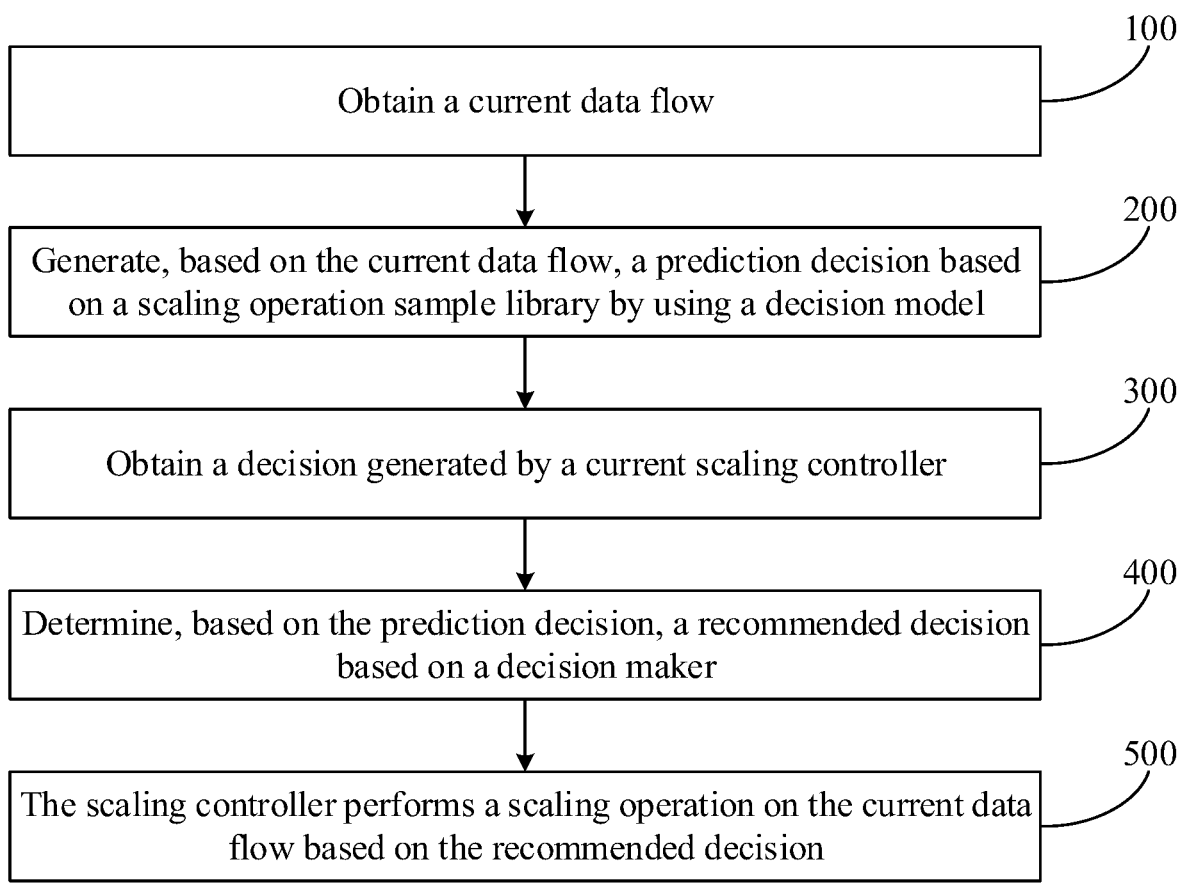
FIG. 5 is a schematic flowchart of a method for enhancing a plug-in for enhancing resource elastic scaling of a distributed data flow according to the present disclosure.

Based on the foregoing architecture diagram, the present disclosure further provides a method for enhancing a plug-in for enhancing resource elastic scaling of a distributed data flow. FIG. 5 is a schematic flowchart of a method for enhancing a plug-in for enhancing resource elastic scaling of a distributed data flow according to the present disclosure. As shown in FIG. 5, the method for enhancing a plug-in for enhancing resource elastic scaling of a distributed data flow according to the present disclosure includes the following steps:

Step 100: Obtain a current data flow.

Step 200: Generate, based on the current data flow, a prediction decision based on a scaling operation sample library by using a decision model. First, the decision model is trained based on the scaling operation sample library, to obtain a trained decision model. Then, the current data flow is predicted by using the trained decision model, to generate the prediction decision. As a data flow load changes, an optimal decision of an elastic scaling controller is gradually stored in the scaling operation sample library. A sample in the scaling operation sample library contains an optimal instance quantity corresponding to a computing node in a specific data flow status. When the plug-in acquires relatively little decision information, an accurate decision model cannot be obtained by training. Alternatively, when the plug-in acquires enough decision information, the plug-in generates a decision model by using a machine learning method, so as to predict an optimal instance quantity.

Step 300: Obtain a decision generated by a current scaling controller.

Step 400: Determine, based on the prediction decision, a recommended decision based on a decision maker. The recommended decision is the prediction decision or the decision generated by the current scaling controller. When the decision model may perform prediction with a relatively low uncertainty, that is, when an uncertainty of the prediction decision generated by the decision model is less than or equal to a threshold, the plug-in returns the prediction decision generated by the decision model as a recommended decision. Alternatively, when the uncertainty of the prediction decision generated by the decision model is greater than the threshold, the plug-in returns the decision generated by the scaling controller as a recommended decision.

Step 500: The scaling controller performs a scaling operation on the current data flow based on the recommended decision. After obtaining the recommended decision obtained from the decision model of the plug-in by combining with a strategy of the decision maker, the scaling controller executes the recommended decision, to complete resource scaling of the current step.

After completing the scaling operation, the scaling controller determines, by judging whether the recommended decision meets a convergence condition, whether the recommended decision corresponding to the scaling operation is optimal, that is, determines decision quality of the recommended decision corresponding to the scaling operation.

When the recommended decision meets the convergence condition, it is determined that the recommended decision corresponding to the scaling operation is optimal, and the recommended decision is stored in the scaling operation sample library as an optimal decision.

Each example of the present specification is described in a progressive manner, each example focuses on the difference from other examples, and the same and similar parts between the examples may refer to each other.

In this specification, some specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A method for enhancing resource elastic scaling of a data flow applied to a plug-in connected to a scaling controller, comprising:
    obtaining a data flow;
    generating, by using a decision model, a prediction decision for the data flow, wherein the decision model is a machine learning model;
    obtaining a decision generated by the scaling controller;
    determining a recommended decision based on an uncertainty of the prediction decision, wherein when the uncertainty of the prediction decision is greater than a threshold, the decision generated by the scaling controller is determined as a recommended decision; and
    when the uncertainty of the prediction decision is not greater than the threshold, the prediction decision is determined as the recommended decision;
    performing, by the scaling controller, a scaling operation on the data flow based on the recommended decision; and
    after completing the scaling operation, determining decision quality of the recommended decision corresponding to the scaling operation comprises:
        determining, by judging whether the recommended decision meets a convergence condition, whether the recommended decision corresponding to the scaling operation is optimal; and
        determining, when the recommended decision meets the convergence condition, that the recommended decision corresponding to the scaling operation is optimal, or
        determining, when the recommended decision does not meet the convergence condition, that the recommended decision corresponding to the scaling operation is not optimal.

2. The method according to claim 1, wherein the method further comprises:
    after completing the scaling operation, determining the decision quality of the recommended decision corresponding to the scaling operation and feedbacking the decision quality to the plug-in, wherein the decision quality of the recommended decision is used to determine whether the recommended decision is optimal; and
    storing the recommended decision as the optimal decision when the recommended decision is optimal.

3. The method according to claim 1, wherein generating, by using the decision model, the prediction decision for the data flow comprises:
    training the decision model; and
    predicting the data flow by using the trained decision model, to generate the prediction decision.

* * * * *